(12) United States Patent
Sauvage et al.

(10) Patent No.: US 7,324,636 B2
(45) Date of Patent: Jan. 29, 2008

(54) MULTIPLE VOICE CHANNEL COMMUNICATIONS

(75) Inventors: Pierre Sauvage, deceased, late of Notre Dame de Commiers (FR); by Valerie Sauvage, legal representative, Corbas (FR); Marc Brandt, Eybens (FR); Jean-Philippe Caradec, Seyssins (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 643 days.

(21) Appl. No.: 10/690,663

(22) Filed: Oct. 23, 2003

(65) Prior Publication Data

US 2004/0228463 A1 Nov. 18, 2004

(30) Foreign Application Priority Data

Oct. 24, 2002 (EP) .................................. 02354169

(51) Int. Cl.
*H04M 3/42* (2006.01)
*H04M 1/64* (2006.01)

(52) U.S. Cl. .............................. 379/201.01; 379/88.01

(58) Field of Classification Search ............................... 379/202.01–202.02, 207.02, 207.16, 88.01–88.03, 379/201.01
See application file for complete search history.

(56) References Cited

U.S. PATENT DOCUMENTS 5,373,549 A * 12/1994 Bales et al. .............. 379/93.21
5,771,273 A    6/1998 McAllister et al.
5,889,844 A *  3/1999 Kim et al. .............. 379/202.01
6,118,861 A    9/2000 Gutzmann et al.
6,275,806 B1 * 8/2001 Pertrushin .................... 704/272
6,404,873 B1   6/2002 Beyda et al.
6,959,079 B2 * 10/2005 Elazar .................... 379/265.06
2002/0077089 A1 6/2002 Contreras

FOREIGN PATENT DOCUMENTS

DE  100 46 208 A1  3/2002
EP    1 096 767 A2  5/2001
EP    1 156 647 A1  11/2001

* cited by examiner

*Primary Examiner*—William J. Deane, Jr.

(57) ABSTRACT

According to one aspect of the present invention, there is provided apparatus for controlling a communications system having a plurality of voice channels and a user terminal for receiving at least one of the voice channels comprising: a receiving element for receiving a plurality of the voice channels, a controller for identifying one of the voice channels to be monitored, an event detection element for detecting the presence of a predeterminable event in the identified voice channel, and an alert generator for generating an alert when the predetermined event is detected.

25 Claims, 3 Drawing Sheets

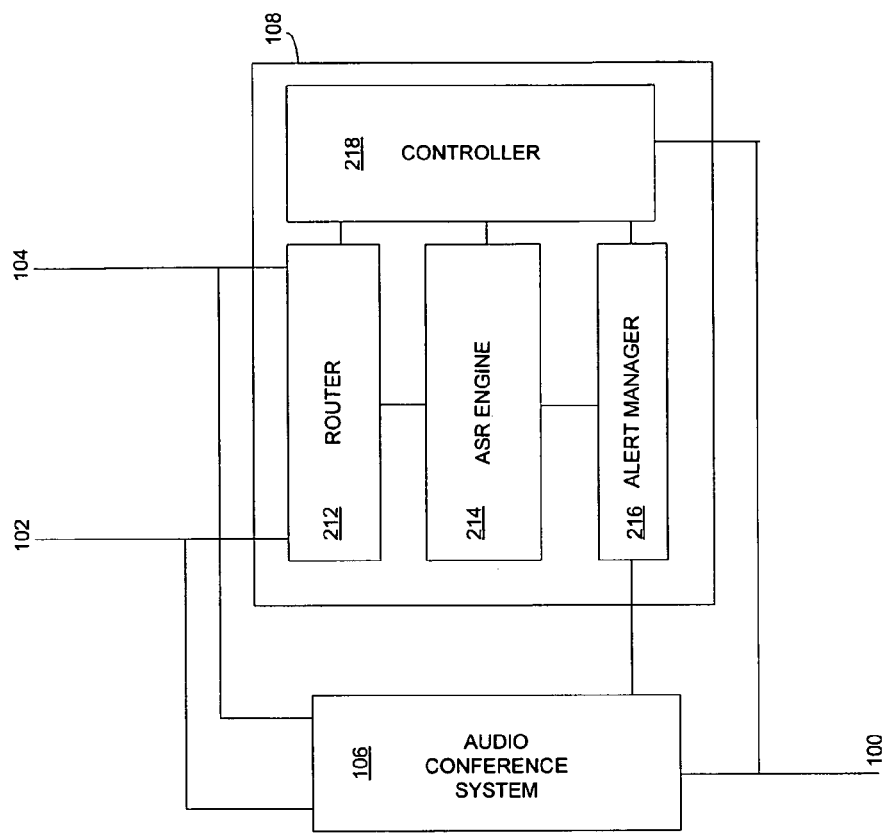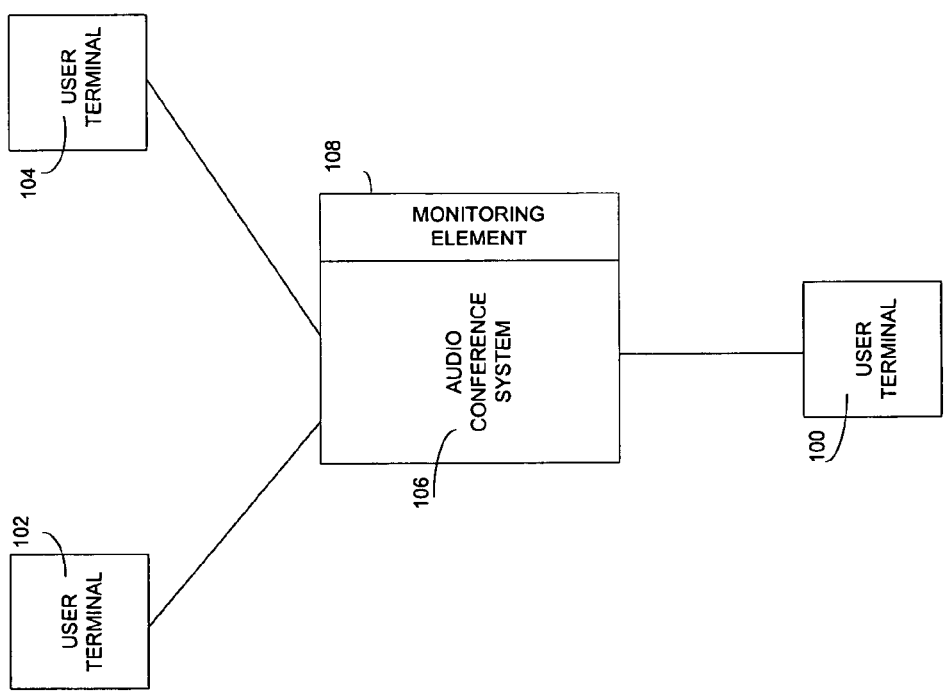

MULTIPLE VOICE CHANNEL COMMUNICATIONS

The present invention relates generally to the field of telecommunications and more particularly to telecommunications involving more than one voice channel.

Due to significant technology advances in recent years many telecommunications systems now enable users to establish and control multiple voice channel communications with relative ease. An example of a multiple voice channel communication service is call waiting, in which a calling party may establish separate connection paths with two or more called parties and may selectively switch between communicating with each party. Each of the connection paths provides a separate voice channel through which voice communication may take place. With call waiting, since generally only one call can be active at any one time, there is what may be referred to as a 'foreground' voice channel for the current active call through which two-way communication may take place, and a 'background' voice channel for the current call on hold through which generally no communication may take place.

The number of voice channels present, however, is not necessarily linked to the number of active connections. For example, multiple voice channels may also exist in telephone-based audio conferencing systems, even where only a single connection path is established between a caller and an audio conferencing service. In an audio conference it is usual for all parties to the conference to participate in a single voice channel through which all the parties may talk and listen to the other parties. It is also becoming increasingly common to enable subconferences to be established within an audio conference from a subset of the participants. A subconference typically allows the creation of an additional and separate voice channel in which only parties to that subconference or voice channel may participate. Typically no audio signals are received from the main audio conference by participants of a subconference, however systems do now exist which enable voice signals from a background voice channel to be mixed with audio signals from a foreground voice channel. Such systems, such as that described in U.S. Pat. No. 6,404,873 to Beyda et al., enable a user to hear voice signals from the main audio conference at the same time as participating in the subconference.

However, problems can exist in such multiple voice channel environments due in part to the limited way in which users may control and manage how they receive voice signals from different voice channels. For example, if a system is arranged such that a user does not receive voice signals from a background voice channel any information carried in that voice channel will be missed by the user. However, if a system is configured such that a user simultaneously receives voice signals from multiple voice channels there is an increased risk that information may be missed due to overloading of human audible senses. Although, from a technical viewpoint, multiple voice channels may provide numerous benefits to users, users are currently not always able to take full advantage of these benefits due to physical human constraints in coping with information coming from multiple sources simultaneously.

Accordingly, one aim of the present invention is to help alleviate at least some of the above-mentioned problems.

According to a first aspect of the present invention, there is provided apparatus for managing a communications system having a plurality of voice channels and a user terminal for receiving at least one of the voice channels. The apparatus comprises a receiving element for receiving a plurality of the voice channels, a controller for identifying one of the voice channels to be monitored, an event detection element for detecting the presence of a predeterminable event in the identified voice channel, and an alert generator for generating an alert when the predeterminable event is detected.

Advantageously this allows a user to be able to interact with a far greater number of simultaneous voice channels than is possible just using the human senses. By allowing selected voice channels to be monitored automatically a user can decide not to receive voice signals from these channels although can rely on the automatic monitoring of these channels to alert him to the presence of predeterminable events occurring within those channels.

Preferably the controller is adapted to identify a voice channel in response to a request from the user terminal.

The predeterminable event may be the occurrence of a keyword in which case the event detection element may be adapted to detect the keyword through speech recognition.

The predeterminable event may also be, for example, a silence period.

The controller may also be adapted for identifying a plurality of voice channels to be monitored and, in which case, the event detection element may be adapted for monitoring each selected voice channel for a different event.

The alert generator may be adapted for transmitting an audible alert to the user terminal. In one embodiment an audible alert may be transmitted by mixing an audible alert with the at least one voice channel received by the user terminal. In a further embodiment the audible alert is preferably transmitted at a time when the audio level of the at least one voice channel received by the user terminal is below a predetermined threshold. The alert generator may alternatively be adapted for transmitting a signal to the user terminal to thereby cause the user terminal to generate a local alert.

In a preferred embodiment events to be detected are definable by the user of the user terminal.

The apparatus may further comprise a recording element to record a portion of the monitored voice channel around the detected event. The alert generator may then be adapted for playing the recorded portion to the user.

The apparatus may also comprise an element for automatically establishing a voice channel with a predeterminable destination, in which case the controller may be adapted for selecting that voice channel for monitoring.

According to a second aspect of the present invention, there is provided a method of managing a communications system having a plurality of voice channels and a user terminal for receiving at least one of the voice channels. The method comprises receiving a plurality of the voice channels, identifying one of the voice channels to be monitored, detecting the presence of a predeterminable event in the identified voice channel, and generating an alert when the predetermined event is detected.

Preferably the step of identifying a voice channel is made in response to a request from the user terminal.

The step of identifying a voice channel may also be adapted for identifying a plurality of voice channels and, in which case, the step of detecting may be adapted for monitoring each selected voice channel for a different event.

The step of generating an alert may comprise transmitting an audible alert to the user terminal. In one embodiment the step of generating an alert may comprise mixing an audible alert with the at least one voice channel received by the user terminal. Preferably the alert is transmitted to the user terminal at a time when the audio level of the at least one voice channel received by the user terminal is below a predetermined threshold. Alternatively, the step of generating an alert may comprise transmitting a signal to the user terminal to thereby cause the user terminal to generate a local alert.

Preferably the step of detecting is performed by detecting user definable events.

The method may also include automatically establishing a voice channel with a predeterminable destination and selecting that voice channel for monitoring.

According to a further aspect of the present invention there is provided a user terminal operating in accordance with the above-described method.

According to a yet further aspect of the present invention there is provided apparatus for detecting speech in a telecommunications system having a plurality of voice channels and a user terminal for receiving at least one of the voice channels. The apparatus comprises a receiving element for receiving a plurality of the voice channels, a controller for identifying one of the voice channels to be monitored, a speech recognition engine for detecting the presence of a predeterminable keyword in the identified voice channel, and an alert generator for generating an alert when the predeterminable keyword is detected.

Various embodiments of the present invention will now be described, by way of example only, with reference to the accompanying diagrams, in which:

FIG. 1 is a block diagram showing a system according to a first embodiment of the present invention;

FIG. 2 is a block diagram showing the monitoring element of FIG. 1 in greater detail;

Figure 3:
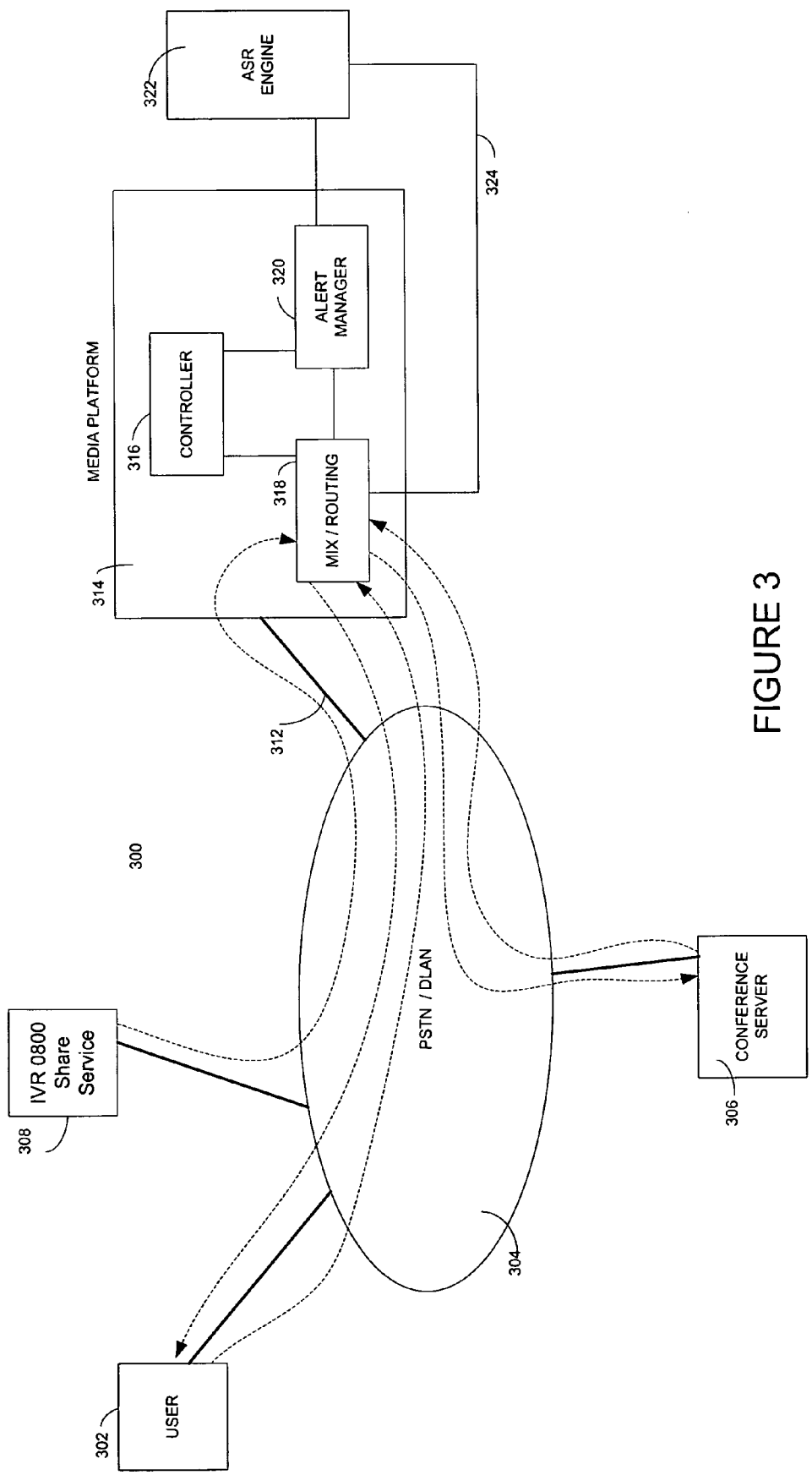
FIG. 3 is a block diagram showing a further embodiment of the present invention.

FIG. 1 is a block diagram showing a multiple voice channel system according to a first embodiment of the present invention. FIG. 1 shows an audio conference system 106 which allows an audio conference call to be established between the user terminals 100, 102 and 104. As is well known in the art, audio conferences may be established in many different ways, such as by using a dial-in or dial-out service, and such techniques will not be discussed further herein.

As is also well known, a user terminal 100 may be used to establish a subconference within the main audio conference with, for example, the user terminal 102. As is typical with such audio conference systems, once a subconference is created the user terminal 100 may only communicate directly with the other members of the subconference. In prior art conferencing systems, whilst participating in a subconference, any information portrayed in the main conference would not be received by the user terminal 100, and hence would have been missed by a user. To help overcome this problem, a monitoring element 108 is provided as shown in FIG. 1.

The monitoring element 108 acts to monitor selected voice channels and to provide an alert when any predeterminable voice tags or keywords are detected therein. In an audio conference, for example, the monitoring element may be used to monitor the main audio conference whilst a user is participating in a subconference. One benefit of this is that it allows a user to better cope with multiple voice channel environments, and a user is no longer constrained by his own ability to monitor and to react to audible information from multiple sources.

The monitoring element 108 is shown in greater detail in FIG. 2 and is described below.

FIG. 2 shows the audio conference system 106 of FIG. 1 which receives voice signals from each of the user terminals 100, 102 and 104 as previously described. The audio conference system 106 manages, controls and performs all the necessary functions to enable audio conferences, subconferences and the like to be established, managed and controlled.

In multiple voice channel environments a voice channel may appear differently to different users. For example, a voice channel which appears as a foreground voice channel to one user may equally appear as a background voice channel to a different user. As previously mentioned, a foreground voice channel typically allows two-way voice communication, whereas a background voice channel typically does not. For example, a party on-hold in a call waiting system (i.e. a background voice channel) is typically unable to communicate with the other party until the on-hold call is made the active call. The following description is considered from the point of view of the user terminal 100.

Voice signals from each of the voice channels 102 and 104 are input to a routing element 212 of the monitoring element 108. Under control of a controller 218, the routing element may direct voice signals from any combination of the voice channels 102 and 104 to an automatic speech recognition (ASR) engine 214. For example, the controller may be configured to enable voice signals from a main audio conference to be monitored whilst the user terminal 100 is participating in a subconference. Through the controller 218 the ASR engine 214 may be configured to monitor a selected voice channel for the presence of one or more voice tags or keywords. A voice tag may comprise, for example, a word, a phrase, an utterance or any other identifiable sound. The ASR engine may, for example, be one of the many ASR engines currently on the market, as will be appreciated by those skilled in the art. Preferably the ASR engine is capable of analyzing continuous speech in one or more languages.

Upon detection of a voice tag by the ASR engine 214 a signal is transmitted to an alert manager 216 which is responsible for generating an appropriate alert. An alert may, for example, consist of an alert to a user of the user terminal 100, an alert to the user terminal 100 itself, or even an alert to another user or another device as will be described below.

The alert manager 216 may alert the user of the user terminal 100 in any number of ways. For example, the alert manager may cause an audible alert to be mixed with the voice signals sent from the audio conferencing system 106 to the user terminal 100. An audible alert may include, amongst others, an audible tone, a spoken alert and a recording of a portion of the monitored voice channel. For example, it may be preferable to continually record, for instance in a circular buffer or recording element, the voice channel which is being monitored. Thereafter, if a keyword is detected within the voice channel, the alert may consist of playing to the user a few seconds of the recording occurring around the detection of the keyword so that user may better understand the context of the detected keyword.

An alert may also be non-audible and may, for example, cause the audio conference system 106 to switch the voice channel in which the keyword was detected to be the current foreground voice channel. For example, if a voice tag is detected in the main audio conference the alert may cause the user to leave a subconference to rejoin the main audio conference. Such an alert may also be arranged to cause all participants of the subconference to rejoin the main audio conference.

In a preferred embodiment, a spoken or whispered alert is given to the user during a suitable pause in the conversation, much in the way that a person might interrupt someone not in mid-flow, but at an appropriate break-point in the conversation. Such an interruption may be detected, for example, by determining the presence of a silent gap, or a period when the audio level in the voice channel is below a predeterminable threshold.

The alert manager may also cause an alert to be sent to the user terminal 100 itself. This may be, for example, using in-band signaling, or out-of-band signaling such as a short message (SMS) or Email message. Upon receipt of an alert the user terminal 100 may generate a local alert to the user of the terminal. For example, a local alert may include flashing a light, causing the user terminal to vibrate or sounding an alarm within the user terminal 100.

The alert manager may also cause an alert to be sent to an external device, such as a radio pager, mobile telephone, email account and so on. Such an alert may be sent in any appropriate format, such as SMS, Email and the like.

Preferably the way in which the alert manager 216 generates alerts is user definable, for example by storing a set of user preferences in the controller 218.

For clarity of explanation the example described above in relation to FIG. 2 only shows that a single voice channel may be monitored at one time. However, in a preferred embodiment the controller 218 may be configured to allow multiple voice channels to be monitored simultaneously for the presence of a set of predeterminable voice tags. Additionally the controller 218 may be configured to monitor different voice channels for the presence of different sets of voice tags.

Although only one ASR engine 214 is shown it will be appreciated that multiple ASR engines, or multiple instances of the ASR engine, may be implemented to enable more efficient monitoring of multiple voice channels for one or more sets of voice tags. For example, a different ASR engine may be used for each different voice channel to be monitored, each ASR engine being configured through the controller 218 to detect the required set of voice tags.

Preferably the monitoring element 108 may be configured through the user terminal 100 using, for example, dual tone multi-frequency (DTMF) tones or voice commands.

Preferably the voice tags which are to be detected are user definable by the user of the user terminal 100 and may be stored, for example, in a storage device (not shown) such as a memory or a disk drive within the monitoring element 108. Voice tags may, for instance, be stored by speaking the desired keywords and having them recorded by the monitoring element 108. It may also be possible for one or more sets of user defined voice tags to be stored in a user profile for use with the monitoring element. The user profile may be stored as part of the monitoring element 108, or may be stored externally to the monitoring element. When stored externally to the monitoring element, for example, on a Internet-linked computer server, only a link or other location indicator to the user profile need be provided to enable the user defined voice tags to be accessed. For example, it may be preferable for the user defined voice tags to be entered in text format via an Internet web page.

For clarity the above-description is made from the point of view of the user terminal 100. It will be appreciated, however, that the monitoring element 108 may also be implemented for each of the participants to the audio conference system, thereby allowing each of the participants to selectively monitor any voice channel which is available to them.

Although the monitoring element 108 of FIGS. 1 and 2 is illustrated as being a single element, it will be appreciated by those skilled in the art that the sub-systems 212, 214, 216 and 218 are not limited to being located within a single module or element, and one or more of these sub-systems may be remote from the others, for example, such as being distributed over a network. Such an embodiment is described below with reference to FIG. 3.

FIG. 3 is a block diagram showing a further embodiment of the present invention, in which monitoring of one or more voice channels, in the manner generally described above, may be provided, for example, through a voice service or media platform, such as the Hewlett-Packard OpenCall Media (OCMP) platform. For clarity of explanation only a simplified view of the media platform 314 is shown.

FIG. 3 shows a general telecommunications system 300 in which a user 302 may connect to the media platform 314 through a telecommunications network 304. The telecommunications network 304 may be, for example, an SS7 based PSTN, a voice over IP (VoIP) network, or any other suitable network. The media platform 314 may be connected to the network by a high capacity transmission link 312, such as an optical SONET link, capable of carrying thousands of simultaneous voice calls as will be appreciated by those skilled in the art.

The media platform 314 enables the user 302 to place additional calls, for example, to an audio streaming service 308, such as an audio share service providing details of share prices, and an audio conference server 306. The media platform 314 comprises a mixing and routing element 318 which, in conjunction with a controller 316, manages the multiple connections and controls the appropriate mixing and routing of the available voice channels such that the user may control through which voice channels he wishes to communicate. The direction of the voice paths within the system 300 is illustrated by the various dotted lines. For example, the audio streaming service 308 is shown as being a streaming only service with the audio path being shown as unidirectional from the streaming service 308 to the media platform 314. Bi-directional audio paths are shown between media platform 314 and the conference server 306 and between the user 302 and the media platform 314.

As previously described, the user 302 may configure the media platform, for example through the media platform, such that no audio signals from the audio streaming service are sent to the user, for example, whilst the user is participating in the audio conference provided by the audio conference server 306. To help ensure that any information relevant to the user portrayed in the audio channel from the audio streaming service 308 is not missed, the user may configure the media platform to monitor this audio channel and to generate an alert whenever a predeterminable event such as a keyword is detected therein.

For example, in a configuration mode the user 302 may define one or more keywords to be detected in a selected voice channel. The keyword(s) may, for example, be stored in an alert manager 320, which may in turn communicate the keyword(s) to an automatic speech recognition (ASR) engine 322. In the example shown the ASR engine 322 is remote from the media platform 314 and is connected via a link 324. Preferably the link 324 is a real-time protocol (RTP) link. Once the system is configured, the user may participate in the audio conference provided by the audio conference server 306 in the normal manner. The mixing/routing element 318 routes the voice channel from the audio streaming service 308 to the remote ASR engine 322 via the link 324. Upon detection of any of the defined keywords by the ASR engine 322 a signal is sent to the alert manager 320 which generates an appropriate alert, for example, in any previously described manner.

Figure 4:
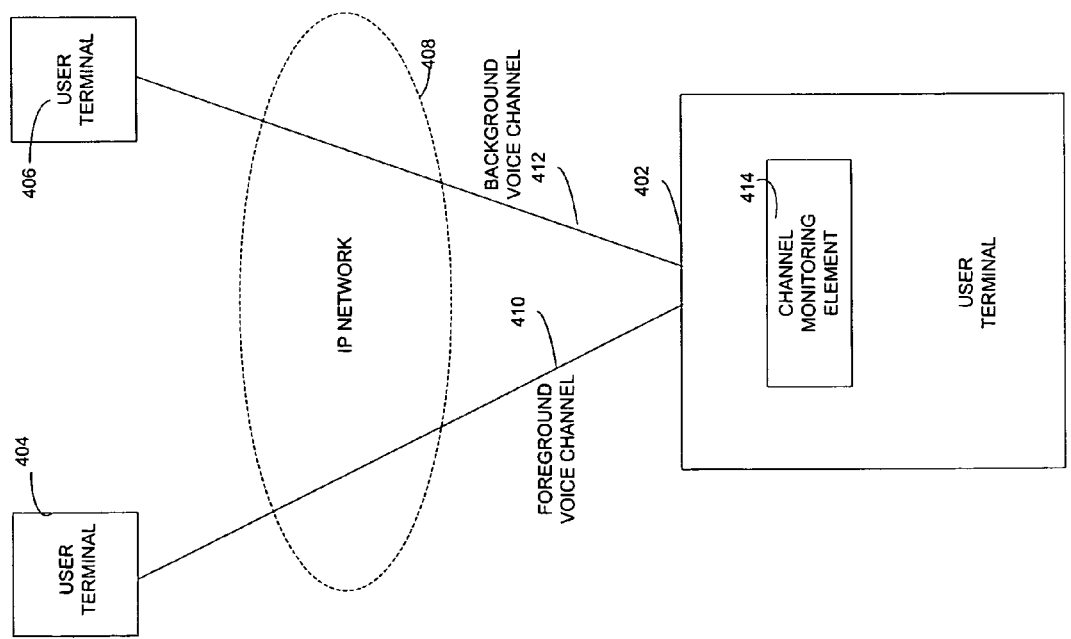
FIG. 4 is a block diagram illustrating a yet further embodiment of the present invention.

FIG. 4 is a block diagram illustrating a yet further embodiment in relation to a voice over IP (VoIP) system. A VoIP compatible user terminal 402 may connect to a number of other appropriate user terminals 404 and 406 through an Internet protocol (IP) network 408. The user terminals may, for example, be VoIP telephone terminals or suitable equipped computer terminals. The user terminal 402 may be configured, in a generally known manner, to establish two separate voice channels, for example a foreground voice channel 410 between the user terminals 402 and 404, and a background voice channel 412 between the user terminals 402 and 406. The voice channels 410 and 412 are input to a monitoring element 414. The functionality provided by the monitoring element 414 may be similar in nature to that provided by the monitoring element 108 described above in relation to FIG. 2. Generally such a monitoring element may be implemented in any location where access can be gained to the individual voice channels.

In a further embodiment a monitoring element as generally described above, if necessary in conjunction with suitable telephony equipment, may be configured to automatically establish a call to a predetermined telephone number or destination whenever a telephone call is made, and to monitor that call or voice channel for one or more predeterminable voice tags.

The present invention may be used, for example, to enable a telephone based share price information service to be monitored whilst in a separate telephone call. By configuring the monitoring element in an appropriate manner, for example, by defining the voice tags to be those of the company names whose shares are to be monitored, any relevant information relating to those companies will be alerted to the user.

The present invention may also be used, for example, when a call is made to customer service call center. Often such calls are answered by an automated voice queuing application which informs the caller that the call will be answered as soon as an operator is available. Such calls may involve long waits whilst waiting in the queue. By making appropriate use of the herein-described monitoring system the time normally wasted waiting for the call to be answered may be advantageously used, for example, to place an additional telephone call. The user can thereby await an appropriate alert from the monitoring element to indicate when the initial call has been answered.

Those skilled in the art will appreciate that any type of voice channel may be monitored, whether the voice channel be a foreground voice channel, a background voice channel or whatever. In a system in which multiple voice channels may be monitored there is preferably no restriction on the type of voice channels which may be monitored.

It will also be appreciated that monitoring is not limited to monitoring a voice channel for the presence of a voice tag or keyword. For example, monitoring may be performed to detect the presence of any definable event, for example a silence period, a call being answered and so on. Depending on particular requirements the system may be adapted to monitor voice channels for the presence of both voice tags and other definable events. Where a detectible event is a silence period this may be used, for example, in a situation wherein a user is participating in multiple conference calls at one time but is only listening to one of the conference calls. In this case, should a question be asked of the user in a conference call to which the user is not listening, the detection of a silence period may alert the user that a response is expected. It may, therefore, be particularly useful to provide a replay of a recorded period of the audio signals occurring before the silence period was detected in order to help enable the user to regain the current context of the conference call.

Other definable events may include, for example, semantic content of the voice channel being monitored, intonation-based triggers such as the detection of questions based on detecting appropriate intonation, speaker recognition and so on.

The invention claimed is:

1. Apparatus for managing a communications system having a plurality of voice channels and a user terminal for receiving at least one of the voice channels, the apparatus comprising:
   a receiving element for receiving a plurality of conference voice channels;
   a controller for identifying one of the conference voice channels to be monitored;
   an event detection element for detecting the presence of a predeterminable event in the identified conference voice channel; and
   wherein the apparatus is configured, in response to the detection of a predeterminable event, to transmit an alert to a user terminal and allow a user to switch the identified voice channel to the user terminal and join a conference.

2. The apparatus of claim 1, wherein the controller is adapted to identify a voice channel in response to a request from the user terminal.

3. The apparatus of claim 1, wherein the predeterminable event is the occurrence of a keyword and wherein the event detection element is adapted to detect a keyword.

4. The apparatus of claim 1, wherein the predeterminable event is a silence period.

5. The apparatus of claim 1, wherein the controller is adapted for identifying a plurality of voice channels to be monitored and wherein the event detection element is adapted for monitoring each selected voice channel for a different event.

6. The apparatus of claim 1, wherein the alert is an audible alert.

7. The apparatus of claim 6, wherein the audible alert is transmitted by mixing an audible alert with the at least one voice channel received by the user terminal.

8. The apparatus of claim 6, wherein the audible alert is transmitted at a time when the audio level of the at least one voice channel received by the user terminal is below a predetermined threshold.

9. The apparatus of claim 1, further comprising an alert generator that is adapted for transmitting a signal to the user terminal to thereby cause the user terminal to generate a local alert.

10. The apparatus of claim 1, in which the events to be detected are definable by the user of the user terminal.

11. The apparatus of claim 1, further comprising a recording element to record a portion of the monitored voice channel around the detected event, further comprising an alert generator that is adapted to playing the recorded portion to the user.

12. The apparatus of claim 1, further comprising an element for automatically establishing a voice channel with a predeterminable destination, and wherein the controller is adapted for selecting that voice channel for monitoring for a predeterminable event.

13. A method of managing a communications system having a plurality of voice channels and a user terminal for receiving at least one of the voice channels comprising:
   receiving a plurality of conference voice channels;

identifying one of the conference voice channels to be monitored;

detecting the presence of a predeterminable event in the identified conference voice channel;

transmitting an alert to a user terminal; and in response to the detection of the presence of the predeterminable event, allowing a user to switch the identified voice channel to the user terminal and join a conference.

14. The method according to claim 13, wherein the step of identifying a voice channel is made in response to a request from the user terminal.

15. The method according to claim 13, wherein the step of detecting is adapted for detecting the occurrence of a keyword.

16. The method according to claim 13, wherein the step of detecting is adapted for detecting a silence period.

17. The method according to claim 13, wherein the step of identifying a voice channel is adapted for identifying a plurality of voice channels and wherein the step of detecting is adapted for monitoring each selected voice channel for a different event.

18. The method according claim 13, wherein the alert is an audible alert.

19. The method according to claim 18, further comprising mixing an audible alert with the at least one voice channel received by the user terminal.

20. The method according to claim 18, further comprising transmitting the alert to the user terminal at a time when the audio level of the at least one voice channel received by the user terminal is below a predeterminable threshold.

21. The method according to claim 13, further comprising a step of generating an alert by transmitting a signal to the user terminal to thereby cause the user terminal to generate a local alert.

22. The method according to claim 13, wherein the event to be detected is user-definable.

23. The method of claim 13, further comprising automatically establishing a voice channel with a predeterminable destination, and selecting that voice channel for monitoring for a predeterminable event.

24. A user terminal operating in accordance with the method of claim 13.

25. Apparatus for managing a telecommunications system having a plurality of voice channels and a user terminal for receiving at least one of the voice channels, the apparatus comprising:

a receiving element for receiving a plurality of conference voice channels;

a controller for identifying one of the conference voice channels to be monitored;

a speech recognition engine for detecting the presence of a predeterminable keyword in the identified conference voice channel; and an alert generator for generating an alert at a user terminal when the predeterminable keyword is detected; and wherein the apparatus is configured, in response to the alert, to allow a user to join a conference by switching the identified conference voice channel to the user terminal.

* * * * *